(12) United States Patent
Schaub et al.

(10) Patent No.: US 11,441,503 B2
(45) Date of Patent: Sep. 13, 2022

(54) METHOD FOR DETERMINING OPTIMIZED FUEL INJECTION HISTORY

(71) Applicant: FEV Europe GmbH, Aachen (DE)

(72) Inventors: Joschka Schaub, Aachen (DE); Christian Jörg, Herzogenrath (DE); Abdelmajid Mettari, Aachen (DE)

(73) Assignee: FEV Europe GmbH, Aachen (DE)

( * ) Notice: Subject to any disclaimer, the term of this patent is extended or adjusted under 35 U.S.C. 154(b) by 76 days.

(21) Appl. No.: 16/360,416

(22) Filed: Mar. 21, 2019

(65) Prior Publication Data
US 2019/0293013 A1  Sep. 26, 2019

(30) Foreign Application Priority Data
Mar. 22, 2018 (DE) .................. 102018106784.4

(51) Int. Cl.
| | | |
|---|---|---|
| *F02D 41/14* | (2006.01) | |
| *F02D 41/30* | (2006.01) | |
| *F02D 41/40* | (2006.01) | |
| *F02D 35/02* | (2006.01) | |
| *F02D 41/24* | (2006.01) | |

(52) U.S. Cl.
CPC ....... *F02D 41/1406* (2013.01); *F02D 35/023* (2013.01); *F02D 35/028* (2013.01); *F02D 41/2432* (2013.01); *F02D 41/3076* (2013.01); *F02D 41/40* (2013.01); *F02D 41/401* (2013.01); *F02D 41/402* (2013.01); *F02D 2041/1437* (2013.01); *Y02T 10/40* (2013.01)

(58) Field of Classification Search
CPC .... F02D 41/1406; F02D 41/40; F02D 35/023; F02D 41/2432; F02D 35/028; F02D 41/3076; F02D 41/401; F02D 2041/1437; F02D 41/402; Y02T 10/40
See application file for complete search history.

(56) References Cited

U.S. PATENT DOCUMENTS

| | | | | |
|---|---|---|---|---|
| 5,698,776 A | * | 12/1997 | Tomisawa | ............ F02D 35/028 73/114.16 |
| 5,720,265 A | * | 2/1998 | Maki | ................... F02D 13/0215 123/680 |
| 7,131,425 B2 | * | 11/2006 | Ramappan | ............ F02P 5/1522 123/406.21 |
| 7,444,984 B2 | * | 11/2008 | Yamaguchi | ........... F02D 41/005 123/406.47 |
| 7,532,971 B2 | * | 5/2009 | Sasaki | ................. F02D 41/2451 701/102 |
| 7,806,100 B2 | * | 10/2010 | Schnorbus | .............. F02D 41/40 123/299 |
| 9,612,592 B2 | * | 4/2017 | Pueschl | .................. G05B 17/02 |
| 9,885,301 B2 | * | 2/2018 | Schnorbus | ............ F01N 3/0885 |

(Continued)

FOREIGN PATENT DOCUMENTS

DE   102017112213 A1   8/2017

*Primary Examiner* — David Hamaoui
(74) *Attorney, Agent, or Firm* — Dinsmore & Shohl LLP

(57) ABSTRACT

In a method for determining an optimized fuel injection profile in an internal combustion engine, a setpoint combustion profile is firstly defined. Furthermore, at least one influential parameter which influences the setpoint combustion profile is determined. With the influential parameter, a corrected fuel injection profile is determined in a closed-loop control process. This method is preferably repeated iteratively.

8 Claims, 5 Drawing Sheets

(56) References Cited

U.S. PATENT DOCUMENTS

| | | | |
|---|---|---|---|
| 9,909,522 B2* | 3/2018 | Jorg | F02D 35/024 |
| 9,915,210 B2* | 3/2018 | Jorg | F02D 35/026 |
| 2006/0069493 A1* | 3/2006 | Attard | F02D 35/028 |
| | | | 701/106 |
| 2009/0082940 A1* | 3/2009 | Ishizuka | F02D 35/02 |
| | | | 701/103 |
| 2015/0234953 A1* | 8/2015 | Speetzen | G06F 17/10 |
| | | | 703/2 |
| 2016/0123264 A1* | 5/2016 | Oyagi | F02D 41/1446 |
| | | | 701/105 |
| 2019/0093588 A1* | 3/2019 | Schaub | F02D 41/1402 |

* cited by examiner

METHOD FOR DETERMINING OPTIMIZED FUEL INJECTION HISTORY

CROSS-REFERENCE TO RELATED APPLICATIONS

This application claims priority from application Ser. No. 102018106784.4 filed on Mar. 22, 2018 in Germany.

FIELD OF THE INVENTION

The present invention relates to a method for determining an optimized fuel injection profile in an internal combustion engine.

BACKGROUND OF THE INVENTION

For the calibration of the combustion behavior, in particular on a diesel engine, conventional calibration approaches are typically implemented. Here, the fuel injection profile is calibrated manually or using statistical test planning methods by the applications engineer taking into consideration different injection characteristics, individual injection quantities and injection times. This calibration approach is time-consuming and, furthermore, it is not always possible to find the optimum fuel injection profile owing to the wide variety of combinations. Also known, from DE 10 2017 112 213 A1, is a method for cylinder pressure control in which an improved cylinder pressure profile is obtained by means of a modelled combustion center of area.

In order to obtain an optimized fuel injection profile, it is sought to develop an approach which reduces the calibration effort and furthermore identifies the thermodynamic optimum. The aim is to identify the optimum fuel injection profile in order to optimize the thermodynamic combustion behavior. Correspondingly, the method should be capable of reducing the effort involved in the fuel path calibration.

SUMMARY OF THE INVENTION

In a method for determining an optimized fuel injection profile in an internal combustion engine, a setpoint combustion profile is firstly defined. Furthermore, at least one influential parameter which influences the setpoint combustion profile is determined. With the influential parameter, a corrected fuel injection profile is determined in a closed-loop control process. This method is preferably repeated iteratively. A major difference in relation to the prior art consists in that what is implemented here is not a digitalization method or calculation method but rather a closed-loop control approach, in which at least one closed-loop controller (a, pMax, pmi, SOC) is used. In other words: deviations of setpoint values with respect to actual values of the influential parameters, or the controlled variables, are minimized. The setpoint values emerge from the desired setpoint combustion profile, and the actual values emerge either from measured values, which are recorded on the engine, or from simulation values in the case of a (software-based) simulation of an engine. The influential parameters may in particular also be regarded as or referred to as the controlled variables. This closed-loop combustion control approach is special because it can perform closed-loop control on the combustion profile as a whole, and thus leaves no further degrees of freedom open with regard to the combustion. While it is known that individual combustion characteristics can be optimized manually, use is made here of a setpoint combustion profile which extends in particular over the entire combustion cycle. The "entire combustion cycle" may be defined for example in the crankshaft angle range of at least 25° for and after top dead center. In particular, it is relevant with regard to the generation of torque if the "entire combustion cycle" is defined in an angle range from 0° to 20° after top dead center. Alternatively, the "entire combustion cycle" may be defined from the closure of the inlet valve to the reopening of a valve, wherein the latter valve may be optionally an inlet valve or outlet valve. In other words: the setpoint combustion profile also encompasses a crankshaft angle range which lies not only in the region of the constant cylinder pressure gradient a and/or not only in the range of a cylinder peak pressure PMax which is to be controlled in closed-loop fashion so as to be constant.

It is advantageous if a setpoint heat release is determined from the setpoint combustion profile, and the determination of the corrected fuel injection profile is performed taking into consideration the setpoint heat release. This is the case in particular if the α value, that is to say the cylinder pressure gradient, and/or the cylinder peak pressure are controlled in closed-loop fashion in the control loop. If the setpoint heat release is set in relation to the lower calorific value of the fuel, this yields the fuel injection profile.

In particular, the at least one influential parameter is an influential parameter from the following list, as follows: a cylinder pressure gradient of the cylinder pressure increase a at the start of combustion, a cylinder peak pressure pMax, an indicated mean effective pressure pmi and a start of combustion SOC. Here, in particular, in the method, at least two of these influential parameters and preferably at least three influential parameters and particularly preferably these four influential parameters are used for optimizing the injection profile. The greatest advantages arise if all of the influential parameters are used. On the hand, if there is (partial) interest in the combustion conditions immediately after the start combustion, then the closed-loop control may also be performed only with the cylinder pressure increase a. This closed-loop control may for example optionally be optimized with closed-loop control of the start of combustion SOC in the time domain. Alternatively and/or in addition, this closed-loop control may be scaled with an indicated mean effective pressure pmi obtained by means of an integral of the combustion.

It is furthermore advantageous if in each case one scaling factor as manipulated variable is determined for the influential parameter(s) used as control variable. The scaling factor is helpful in particular for the iterative repetition of the method because, in this way, setpoint/actual value deviations of the controlled variable(s) can be reduced. It is advantageous for exactly one scaling factor to be used for each of the influential parameters. If, in particular, the influential factor is in the form of a setpoint profile (for example a curve) versus the crankshaft angle, use may also be made of multiple influential parameters. These influential parameters are utilized for an approximation to this setpoint profile. The setpoint variable may be a scaling factor, and/or the setpoint variable may for example be an offset value.

In particular, in the method, at least two control loops (for example: a, pMax, pmi and/or SOC) may be used for the closed-loop control of the fuel injection profile, which control loops are optimized and parallel. It has for example been identified that, in the case of a non-optimized start of combustion SOC, the controlled variable of the cylinder pressure increase a also cannot be optimally set. It is thus advantageous for these values to be controlled in closed-loop fashion simultaneously. The corresponding advantages also arise in the case of other combinations of the controlled variables. In principle, there is the risk here of instability in the case of closed-loop control simultaneously/at the same time with multiple controlled variables. In the present case, it has however been identified that the influential parameters or the controlled variables are independent of one another such that they can be optimized at the same time.

In particular, in a first crankshaft angle range, the optimization of the fuel injection profile is performed with the aid of a first parameter, and in a second crankshaft angle range, the optimization of the fuel injection profile is performed with the aid of a second, different parameter, and the first and second crankshaft angle ranges do not overlap. This optimization is expedient for example for controlled variables which are used in a time-offset manner, such as for example the cylinder pressure increase a and the pressure limitation by means of pMax.

Alternatively and/or in addition, in a third crankshaft angle range, the optimization of the fuel injection profile may be performed with the aid of a third parameter or controlled variable, and in a fourth crankshaft angle range, the optimization of the fuel injection profile may be performed with the aid of a fourth parameter or controlled variable, and the third and fourth crankshaft angle ranges overlap in this case. The third and fourth parameters may be identical to the first and second parameters. It is thus for example possible for closed-loop control to be performed by means of the indicated mean effective pressure pmi, wherein the pmi value is the integral over the pressure of the combustion cycle and may be controlled in closed-loop fashion by means of the cylinder pressure increase a.

In particular, the optimized fuel injection profile may be performed with closed-loop control of the cylinder peak pressure, and in the event that no scaling factor of the cylinder peak pressure can be determined such that a setpoint cylinder pressure is not overshot, the range of action of the closed-loop controller for the cylinder peak pressure may be expanded toward earlier crankshaft angle positions until such time as the control deviation of the cylinder peak pressure is eliminated. This is a result that emerges in particular from the parallel closed-loop control with multiple scaling factors (or manipulated variables).

It is furthermore advantageous if the corrected fuel injection profile is fed to a physically existing internal combustion engine, on which measured values of the resulting combustion profile are recorded, and the measured values are fed to the method, because, in the prior art, these optimizations have had to be performed manually, which was time-consuming and not nearly as accurate.

Alternatively, the corrected fuel injection profile may be fed to a simulated internal combustion engine, which obtains actual values of the combustion simulated therewith, which said actual values are fed to the method. In this way, a fully simulated or calculating system can be obtained, wherein the difference in relation to the prior art consists in particular in that closed-loop control operations are performed. The above-stated measured values or simulated actual values of the combustion include in particular a pressure profile in the cylinder and/or a temperature profile in the cylinder and/or a crankshaft torque, by means of which the cylinder pressure can be determined.

DESCRIPTION OF THE DRAWINGS

The invention will be described by way of example below on the basis of the figures, in which.

DETAILED DESCRIPTION OF THE
PREFERRED EMBODIMENTS

Figure 1:
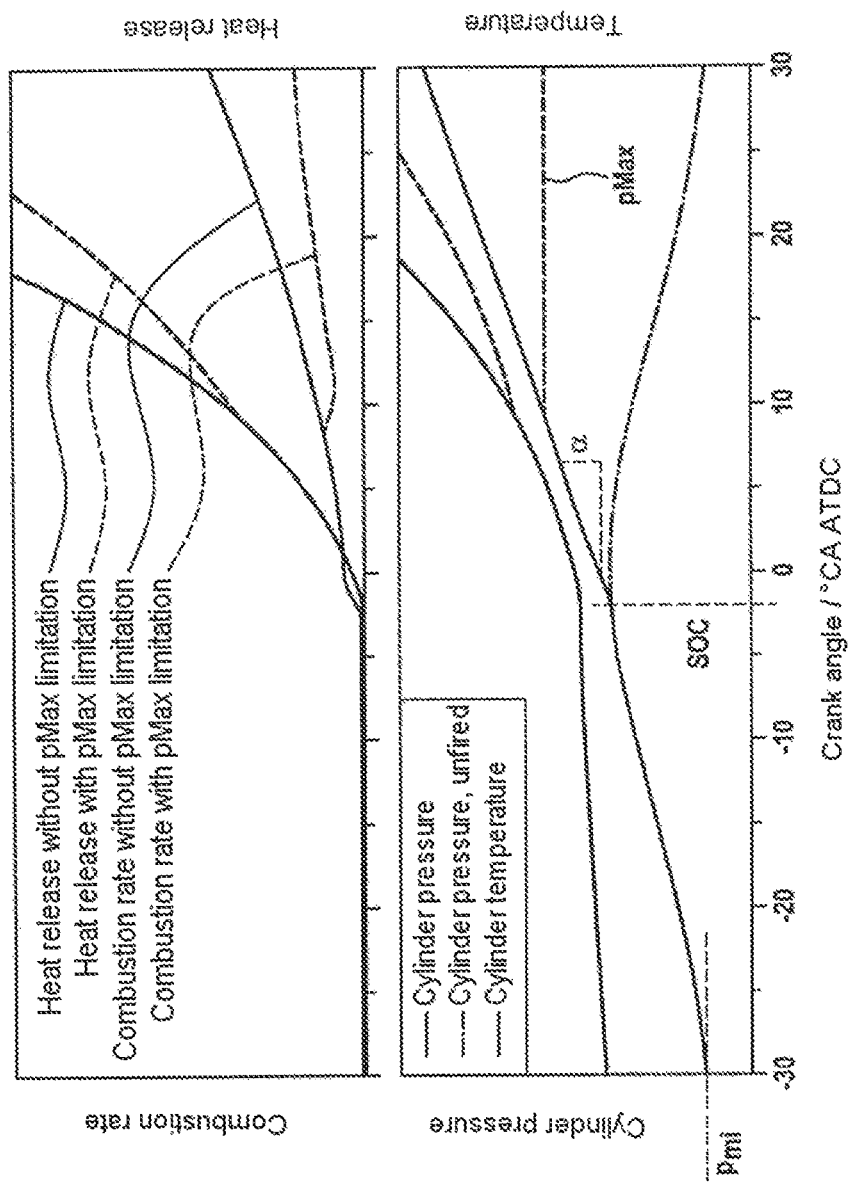
FIG. 1 shows a setpoint combustion process on the basis of a setpoint cylinder pressure profile, taking into consideration the combustion characteristics of a start of combustion SOC, of a cylinder pressure increase a, of a cylinder peak pressure pMax and of an indicated mean effective pressure pmi.

A setpoint combustion profile is shown in FIG. 1. Here, in the lower part of FIG. 1, a setpoint cylinder pressure profile is taken as a starting point. This is determined by the following characteristics: the indicated mean effective pressure pmi, the start of combustion SOC, the cylinder pressure increase gradient a and the cylinder peak pressure pMax. These variables are shown in the lower half of the diagram. Accordingly, the cylinder pressure increases as the piston rises, until the start of combustion SOC begins at a crankshaft angle of approximately −2°. Thereafter, the pressure in the cylinder increases uniformly with the cylinder pressure increase gradient a, until it has reached the admissible maximum value pMax. From this point in time onward, it is sought to control the combustion in closed-loop fashion such that the pressure increases no further. The setpoint line of the cylinder pressure is thus the solid dark line of the cylinder pressure which transitions into the dotted horizontal line of pMax. By means of a pressure profile analysis, it is possible to generate further thermodynamic characteristic variables, such as for example the cylinder pressure profile, the heat release or the oxygen concentration profile of the gas enclosed in the cylinder. With the at least one cylinder pressure profile, but in particular also with these other thermodynamic state variables, which are illustrated in FIG. 1 versus the crankshaft angle, it is possible for an ignition delay profile to be calculated using a corresponding model. The indicated mean effective pressure of the high-pressure loop pmi is obtained by means of a closed-loop integral of the cylinder pressure profile over one combustion cycle. The heat release emerges from an energy balance and can be back-calculated using the pressure profile.

Below, the fuel injection profile that is sought will be inferred from the described setpoint combustion profile. Here, as per FIG. 2, consideration is given to a correlation between the setpoint heat release profile CHRR (=cumulative heat release rate) and a so-called convertible fuel injection profile EMK taking into consideration the lower calorific value $h_\alpha$ and a scaled factor k:

$$EMK \approx \frac{1}{h_u} \cdot CHRR \cdot k \qquad \text{Equation 1}$$

The fuel injection profile, or fuel injection mass profile EMK, includes the fuel fragments that are available for the direct heat release in the combustion chamber. Here, consideration is given in particular to the cumulative injection mass. By contrast, for the control of the fuel injection, a hydraulic fuel injection profile EMH is required, which has a forward time offset in relation to the fuel injection profile EMK. The time offset corresponds here to the local ignition delay, which is known from the ignition delay model that is used.

With these relationships, the following procedure for determining the fuel injection profile that is sought can be defined in the following steps:

Step 1

Firstly, a definition of a setpoint combustion profile is performed. Here, it is for example possible to determine a setpoint cylinder pressure profile in the form of a so-called "Alpha process". In the Alpha process, an increase gradient α of the pressure in the combustion chamber after the start of combustion SOC is defined. The increase gradient a may in particular be regarded as being constant until the maximum pressure pMax is reached. This combustion process is characterized significantly by the following combustion characteristics: start of combustion SOC, cylinder pressure gradient a and cylinder peak pressure pMax, as shown in FIG. 1. From this setpoint cylinder pressure profile, it is ultimately possible to derive thermodynamic state variable profiles (temperature, oxygen concentration, heat release and ignition delay) by means of a pressure profile analysis.

Step 2

For the closed-loop control of the cylinder pressure gradient a, the setpoint heat release CHRR is scaled in accordance with equation 1. Here, particular attention must be paid to the determination of the scaling factor k. A starting value for $k_{\alpha,Initial}$ is determined by means of a characteristic-map-based or model-based method as a function of the engine operating point, operating conditions and of the setpoint combustion profile, in this case in particular the setpoint value for the cylinder pressure gradient $\alpha_{soll}$, in the sense of pilot control. This pilot control value $k_{\alpha,Initial}$ may self-evidently lead to a control deviation, for which reason, in further closed-loop control cycles, correction is performed, and k is obtained. This is realized for example by means of a linear integral closed-loop controller. The α control deviation is thus minimized by means of a correction of $k_{\alpha,kor}$ in the sense of feedback-type closed-loop control. In the case of the closed-loop α controller, therefore, the cylinder pressure gradient a is the controlled variable, and the scaling factor $k_\alpha$ is the manipulated variable. Alternatively and/or in addition to this, the pMax control deviation may be minimized by means of a corresponding correction of $k_{pMax,kor}$. This is performed similarly to the closed-loop α control.

Figure 2:
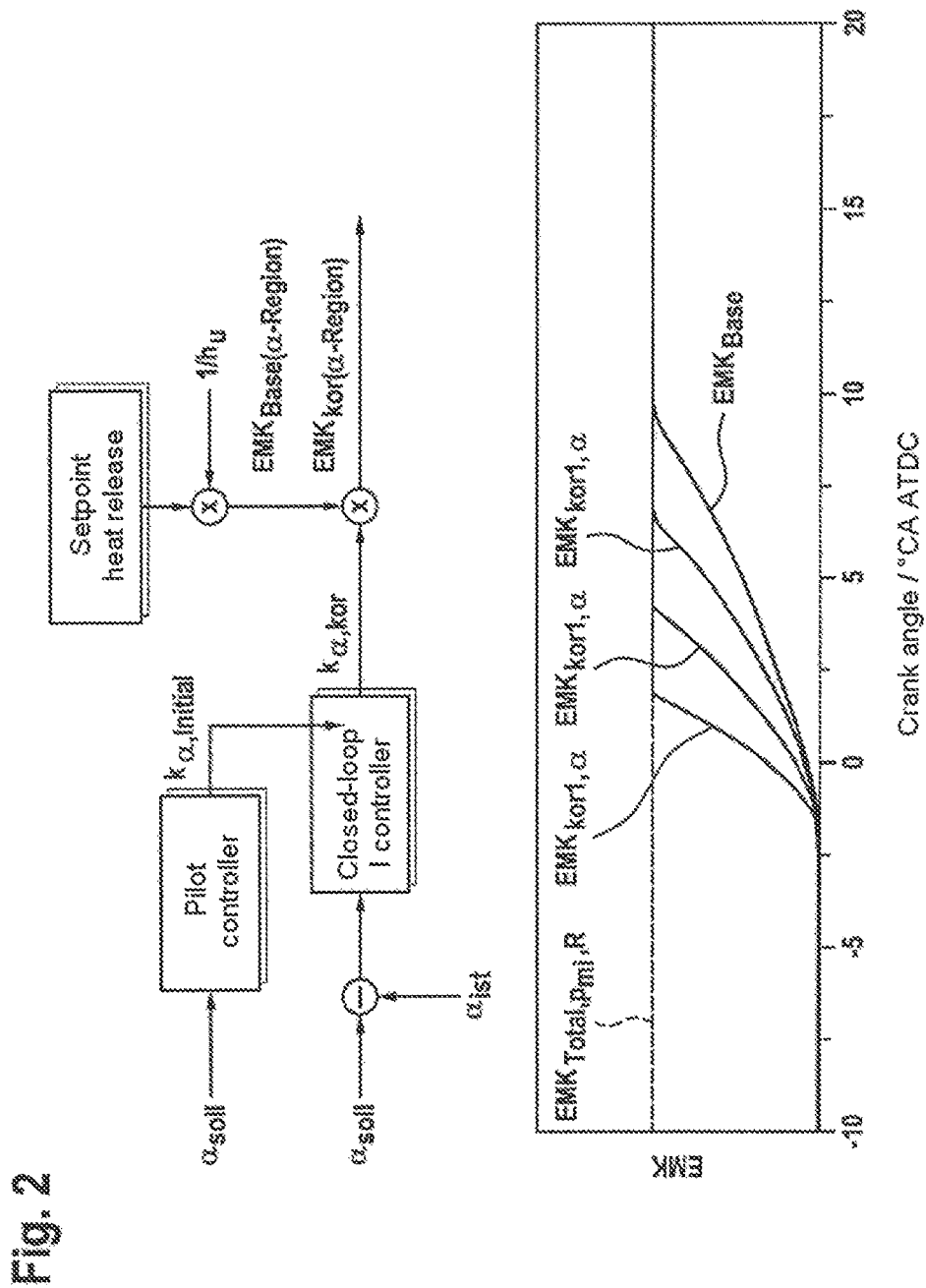
FIG. 2 is a schematic illustration of a closed-loop a controller of the cylinder pressure gradient, and the operating principle thereof with regard to an optimization of a fuel injection profile (EMK)

Thus, here, the cylinder peak pressure pMax is the controlled variable and the corresponding scaling factor $k_{pMax}$ is the manipulated variable. The actual values $\alpha_{ist}$ and $pMax_{ist}$ can be determined from the measured cylinder pressure profile of the preceding combustion profile. The use of both parameters results in two individual closed-loop controllers which are, in principle, independent, specifically: 1: closed-loop α controller and 2: closed-loop pMax controller, which are however based on the same principle, specifically equation 1. Thus, in the case of both controlled variables being used, the distinction between two different scaling factors is necessary, specifically one scaling factor for the closed-loop α controller, $k_\alpha$, and one for the closed-loop controller, $k_{pMax}$. The respective scaling factors change the shape of the EMK profile in accordance with equation 1. The closed-loop control principles of the closed-loop α controller and of the closed-loop pMax controller, and the effects thereof on the EMK profile, are illustrated, for further clarification, in FIGS. 2 and 3. FIG. 2 shows, in the lower region, multiple optimization loops. Here, a first $EMK_{Base}$ profile is taken as a starting point, and the EMK value is optimized in the following loops, which are all denoted by $EMK_{kor1,\alpha}$. The resulting fuel injection profile EMK will be discussed in more detail in the next step 3:

Step 3

Figure 3:
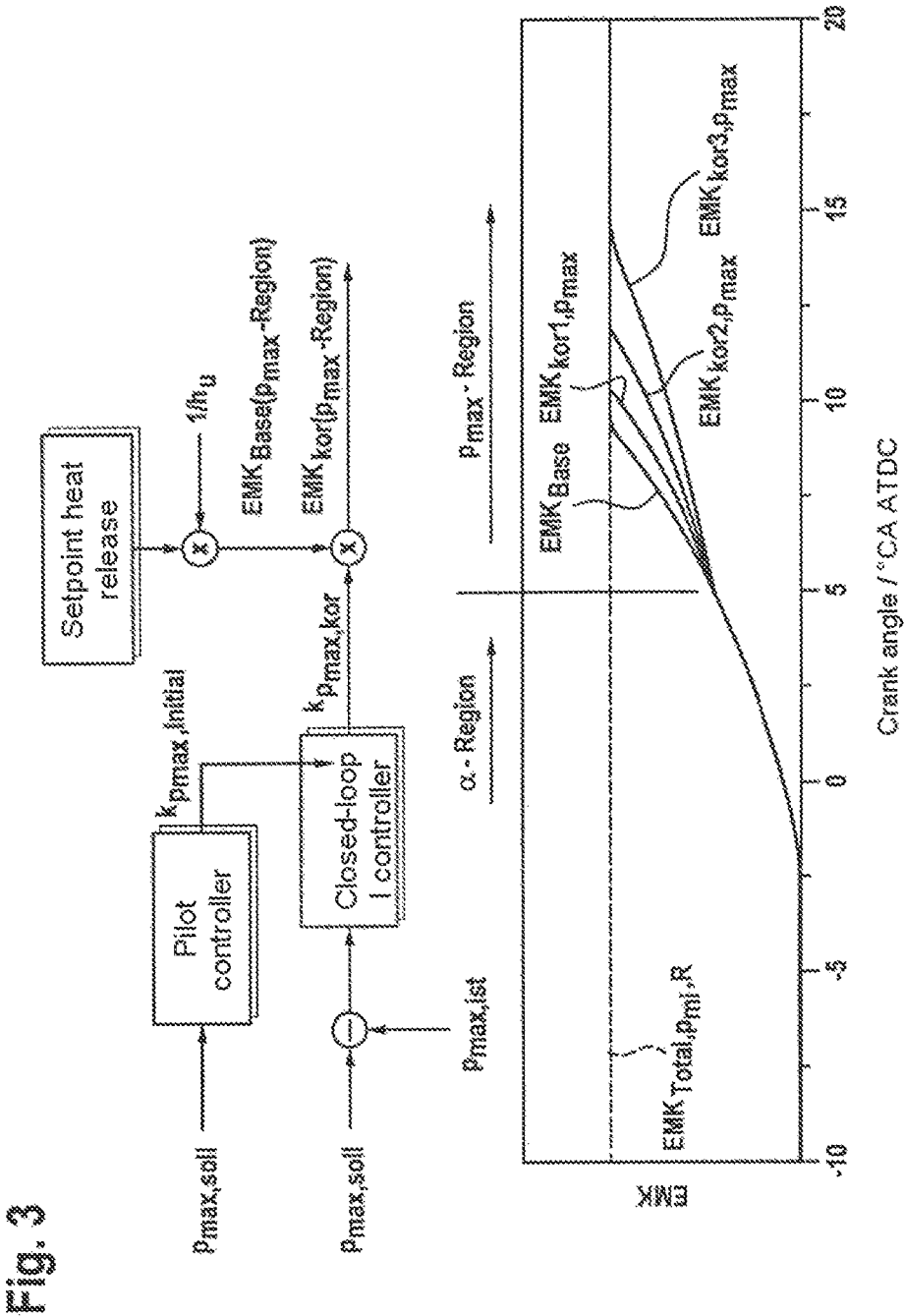
FIG. 3 is a schematic illustration of a closed-loop pMax controller, and the operating principle thereof with regard to the EMK adjustment.

With the known scaling factors, it is thus possible for the EMK profile to be composed in accordance with the described principle of equation 1. Here, the different areas of action of the closed-loop α controller and of the closed-loop pMax controller will differ. These areas of action are defined in particular by ranges of the crankshaft angle, and may in this case preferably not overlap. In particular, they adjoin one another. An example of this is shown in FIG. 1, wherein the optimization is performed by means of the closed-loop α controller in the crankshaft angle from −2° to 10°, and optimization is performed using pMax proceeding from the crankshaft angle of 10°. In the range between SOC and the onset of the pressure limitation, the scaling factor of the closed-loop a controller, $k_\alpha$, remains valid. From the onset of the peak pressure limitation, it is thus then the case that the scaling factor of the closed-loop pMax controller, $k_{pMax}$, applies. The crankshaft angle position where the peak pressure pMax takes effect is known from the definition of the setpoint cylinder pressure profile already before the first closed-loop control cycle. If the pMax limitation is always exceeded by the actual value, that is to say the closed-loop pMax controller finds no scaling factor $k_{pMax}$ that leads to the peak cylinder pressure being adhered to, then the range of action of the closed-loop pMax controller (that is to say the range in which the CHRR is scaled by means of $k_{pMax}$) is shifted gradually and automatically further in the direction of earlier crankshaft angle positions, until the pMax control deviation can be eliminated. The effect of the closed-loop α controller and of the closed-loop pMax controller on the EMK profile is schematically illustrated in FIGS. 2 and 3. Here, exemplary correction sequences of the scaling factors, with corresponding effects on the EMK profiles, are also illustrated. Correspondingly, in the lower part of FIG. 3, it is shown that, at the start, the profile is gradually shifted from $EMK_{Base}$ at a crankshaft angle shortly before 10° and in the individual corrective cycles $EMK_{kor1,pMax}$, $EMK_{kor2,pMax}$ and $EMK_{kor3,pMax}$.

Figure 4:
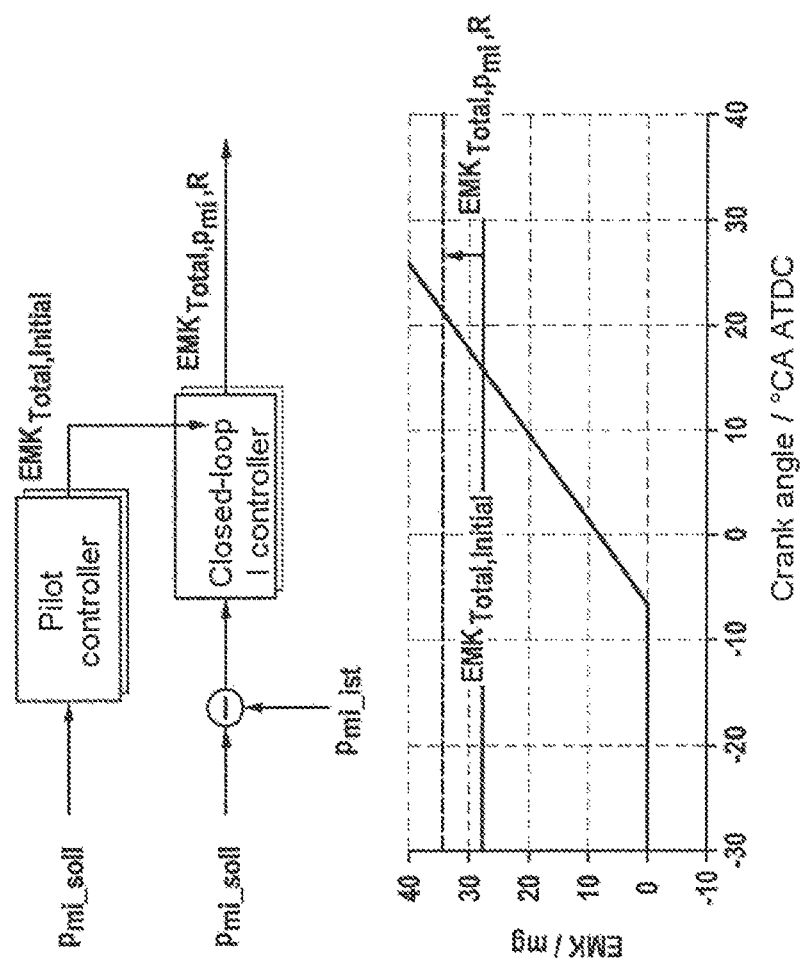
FIG. 4 is a schematic illustration of a closed-loop pmi controller, and the operating principle thereof with regard to the EMK adjustment.

It is to be noted that, in a preferred embodiment, the maximum value of the EMK ($EMK_{total}$) is determined neither by means of the closed-loop α controller nor by means of the closed-loop pMax controller. Instead, the EMK maximum value is determined by means of an additional closed-loop pmi controller. Here, "pmi" describes the indicated mean effective pressure of the high-pressure loop of the combustion process. The controlled variable of the closed-loop pmi controller is thus the indicated mean effective pressure, and the manipulated variable is the EMK maximum value. Therefore, an entire injection profile $EMK_{total}$ is corrected by means of the closed-loop pmi controller until such time as the pmi control deviation is sufficiently small. The EMK profile thus follows the scaled setpoint heat release profile CHRR within the closed-loop a control range or within the closed-loop pMax control range until $EMK_{total}$ is reached. The described closed-loop pmi controller is in this case made up of a pilot controller (for example characteristic-map-based or model-based) and an additional feedback-type closed-loop controller (for example integral closed-loop controller). A schematic illustration of the closed-loop pmi controller is shown in FIG. 4.

Step 4

Figure 5:
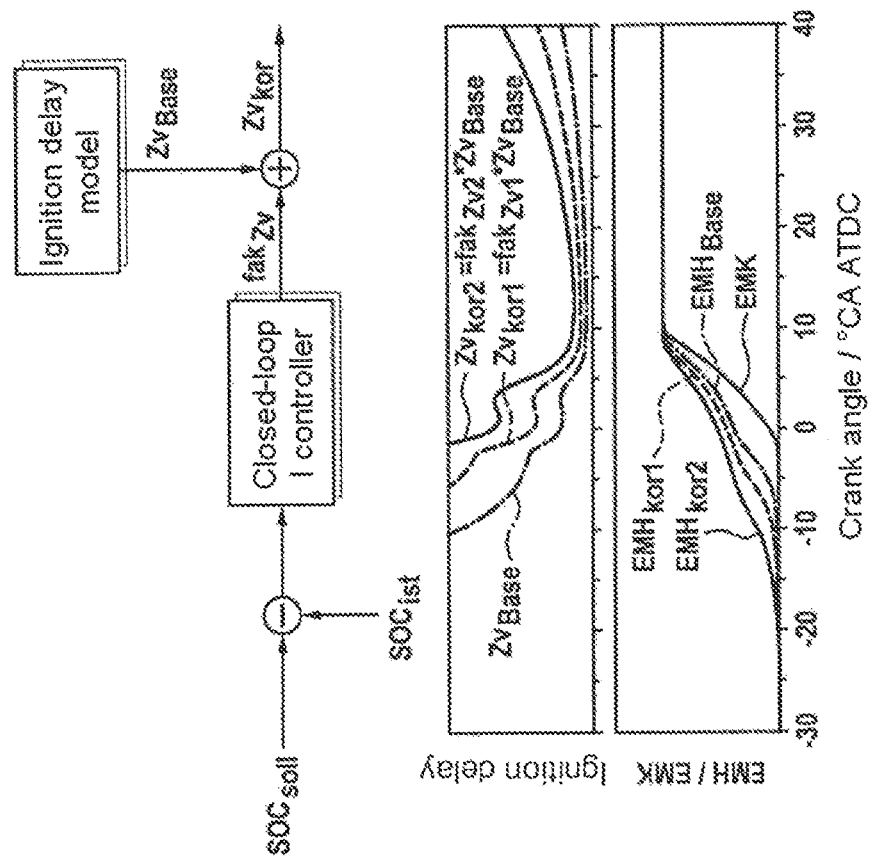
FIG. 5 is a schematic illustration of a closed-loop SOC controller, and the operating principle thereof with regard to the scaling of the ignition delay.

After an EMK profile resolved for a crankshaft angle has been determined in the preceding step, an associated EMH profile is determined in this step. For this purpose, each EMK fragment is shifted, by the local ignition delay, in the direction of earlier crankshaft positions, which ultimately leads to the generation of the desired EMH profile. As mentioned above, the SOC (=start of combustion) is a further important characteristic of the combustion process, which has already been taken into consideration in the creation of the setpoint cylinder pressure profile (step 1). For the correct closed-loop control of the SOC, use is therefore made of a further, independent closed-loop controller (closed-loop SOC controller). The closed-loop SOC controller thus minimizes the SOC control deviation through the use of a pilot controller (for example characteristic-map-based or model-based) and an integral feedback-type closed-loop controller component. The pilot control may, in the usage situation described, be described by means of an ignition delay model which has already been used in step 1 for the generation of the setpoint state variable profile. The actual SOC is, analogously to a and pMax, read out from the measured cylinder pressure profile of the preceding working cycle. As manipulated variable of the closed-loop SOC controller, the ignition delay is used, which, in accordance with the SOC deviation, is adjusted with a constant factor $fak_{Zv}$. By means of the scaling of the ignition delay, the horizontal interval (crankshaft angle difference) between EMH and EMK is corrected, such that the SOC control deviation is sufficiently minimized. To illustrate the operating principle, the closed-loop SOC controller is schematically illustrated in FIG. 5. Here, an exemplary correction sequence of the ignition delay correction factor, with the corresponding effect on the EMK, is illustrated.

Step 5

After the EMH profile has been determined in the preceding step, the EMH profile must then be converted, by means of a so-called digitalization method taking into consideration the fuel injector specifications, into a digital fuel injection profile. Here, from the hydraulic setpoint injection profile, an electrical injection profile is inferred, because it is only in this way that the injection profile can be realized by means of a commercial injector.

Particular advantages resulting from the above-mentioned closed-loop control are thus a concept for closed-loop combustion control, which combines various closed-loop sub-controllers with one another to form a closed overall concept (closed-loop α/pMax/pmi/SOC control), which furthermore requires no further closed-loop controllers. Likewise, the concept permits, for the first time, the synchronous closed-loop control of the relevant combustion characteristics, specifically: peak pressure gradient a, peak pressure pMax, indicated mean effective pressure of the high-pressure loop pmi, start of combustion SOC.

It is to be emphasized here that the closed-loop sub-controllers collectively form a convertible injection mass profile EMK. Here, mutually independent ranges of the EMK are addressed by the respective closed-loop sub-controllers. For a predefined setpoint combustion profile, the overall closed-loop control concept thus identifies a unique EMK profile, which also leads to a unique fuel injection profile. The EMK is thus used as a superordinate manipulated variable of the closed-loop control concept. It is to be highlighted here that, in this way, in particular, the parallel closed-loop control of the characteristics a and pMax is made possible by virtue of the closed-loop controller automatically determining the respective injection quantities, the respective injection times and the injection pattern (number of injections). The closed-loop control concept may be used both for transient closed-loop control methods (for example online implementation of the algorithms on the production control unit) or as a tool for targeted thermodynamic engine calibration of the fuel injection profile (for example in an experimental engine test environment). The fuel injection profiles calculated by means of the closed-loop controller can finally be stored by means of the characteristic maps of the production control unit and replicated in practical operation. Here, considerable calibration effort can be saved in relation to conventional calibration methods.

REFERENCE DESIGNATIONS

CHRR Setpoint heat release
EMK Fuel injection profile
α Cylinder pressure gradient, cylinder pressure increase
pmi Indicated mean effective pressure
SOC Start of combustion
pMax Cylinder peak pressure
k Various scaling factors

The invention claimed is:
1. A closed-loop control feedback method for determining an optimized fuel injection profile of fuel in an internal combustion engine, comprising the steps of:
   determining a current injection profile;
   determining a setpoint combustion profile that extends over an entire combustion cycle,
   determining at least two influential parameters that influence the setpoint combustion profile from the group consisting of:
      a cylinder pressure gradient of a cylinder pressure increase at the start of combustion,
      a cylinder peak pressure,
      an indicated mean effective pressure, and
      a start of combustion,
   determining an actual value for each of the at least two determined influential parameters and at least two manipulated variables, one of the at least two manipulated variables corresponds to one of the at least two determined influential parameters and the other one of the at least two manipulated variables corresponds to the other one of the at least two determined influential parameters, each one of the at least two manipulated variables that correspond to the at least two determined influential parameters, respectively, is a scaling factor that is a continuously adjustable value and is used for minimizing a difference in a value between each of the at least two determined influential parameters and the actual value of the respective influential parameter;
   determining a corrected fuel injection profile in the closed-loop control based on the determined at least two influential parameters and the difference in value between each of the at least two determined influential parameters and the actual value of the respective influential parameter is a controlled variable, generating a corrected fuel injection profile using the determined at least two manipulated variables and the controlled variable for each one of the at least two influential parameters to reduce the value deviation in value between each of the at least two determined influential parameters and the actual value of the respective influential parameter, controlling the current injection profile using the generated corrected fuel injection profile to adjust the current injection profile, and repeating iteratively the preceding steps, wherein the scaling factor is determined by a closed-loop controller to reduce the value deviation between each of the at least two determined influential parameters and the actual value of the respective influential parameter for the current injection profile during the iterative repetition of generating the corrected fuel injection profile in the closed-loop control and adjusting the current injection profile.

2. The method according to claim 1, further comprising the steps of:

determining a setpoint heat release from the setpoint combustion profile, and determining the corrected fuel injection profile by taking into consideration the setpoint heat release.

3. The method according to claim 1 further comprising:

using at least two control loops for the optimization of the fuel injection profile, wherein the control loops are optimized in parallel.

4. The method according to claim 1 further comprising:

optimizing the fuel injection profile with the aid of a first parameter for a first crankshaft angle range and performing optimization of the fuel injection profile with the aid of a second, different parameter, for a second crankshaft angle range, wherein the first and second crankshaft angle ranges do not overlap.

5. The method according to claim 1 further comprising:

optimizing the fuel injection profile for a third crankshaft angle range with the aid of a third parameter, and optimizing the fuel injection profile for a further crankshaft angle range with the aid of a fourth parameter which differs from the third parameter, wherein the third and fourth crankshaft angle ranges overlap.

6. The method according to claim 1 wherein optimizing the fuel injection profile is performed with the closed-loop control of the cylinder peak pressure, and expanding a range of action of the closed-loop controller for the cylinder peak pressure toward earlier crankshaft angle positions until such time as the control deviation of the cylinder peak pressure is eliminated in the event that no scaling factor of the cylinder peak pressure can be determined such that a setpoint cylinder pressure is not overshot.

7. The method according to claim 1 further comprising:

feeding the corrected fuel injection profile to a physically existing internal combustion engine, on which measured values of a resulting combustion profile are recorded.

8. The method according to claim 1 further comprising:

feeding the corrected fuel injection profile to a simulated internal combustion engine, which obtains actual values of the combustion simulated therewith.

* * * * *